Patented Feb. 17, 1925.

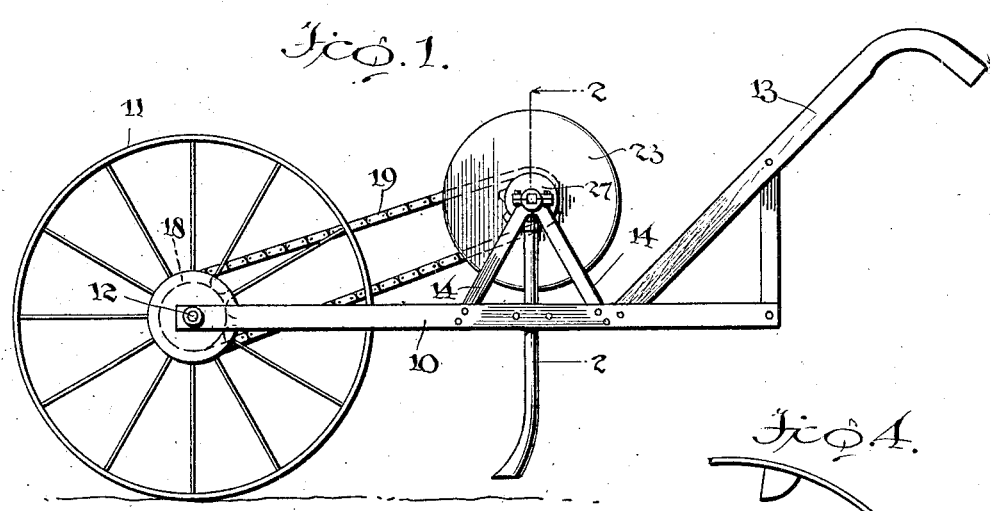
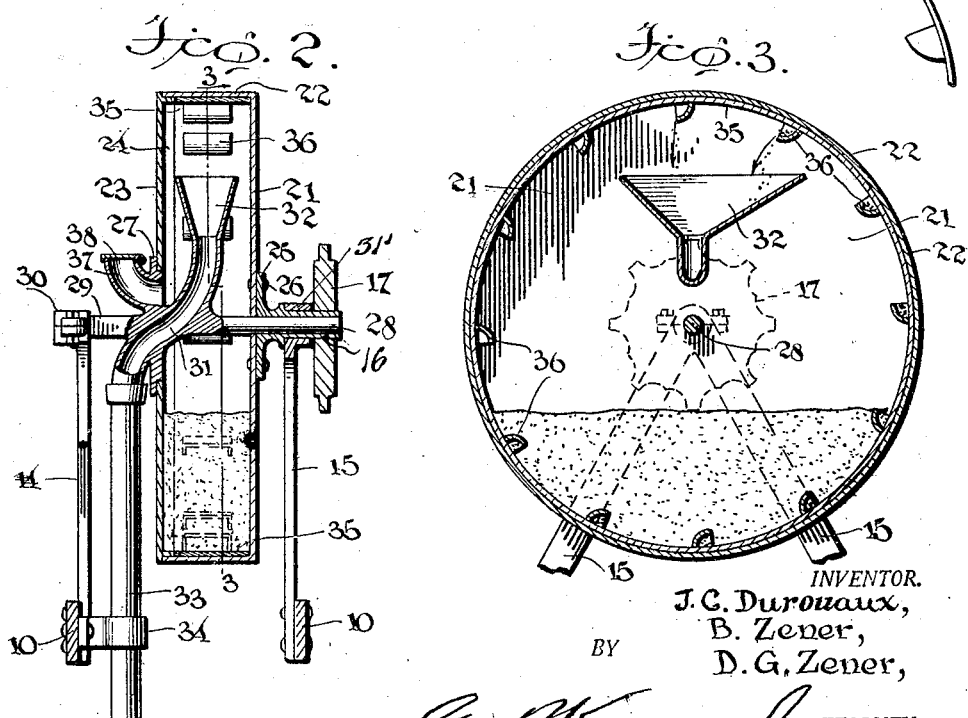

1,527,128

UNITED STATES PATENT OFFICE.

JOSEPH C. DUROUAUX, BENJAMIN ZENER, AND DAVID G. ZENER, OF TIFFIN, MISSOURI.

SEEDER.

Application filed April 8, 1924. Serial No. 705,097.

*To all whom it may concern:*

Be it known that we, JOSEPH C. DUROUAUX, BENJAMIN ZENER, and DAVID G. ZENER, citizens of the United States, residing at Tiffin, in the county of Saint Clair and State of Missouri, have invented certain new and useful Improvements in Seeders, of which the following is a specification.

This invention relates to seeding machines, and has for one of its objects to provide a simply constructed device whereby seeds of various sizes and forms may be uniformly and automatically deposited in the ground.

Another object of the invention is to provide a device of this character adapted to be arranged for discharging seeds of various forms and sizes without structural change in the apparatus.

With these and other objects in view the invention consists in certain novel features of construction as hereinafter shown and described and then specifically pointed out in the claims, and in the drawings illustrative of the preferred embodiment of the invention—

Figure 1 is a side elevation of the improved device.

Figure 2 is a section, enlarged on the line 2—2 of Figure 1.

Figure 3 is a section on the line 3—3 of Figure 2 looking in the direction of the arrow.

Figure 4 is a detail of a portion of the bucket carrying band.

The improved device may be applied to many of the ordinary cultivator frames, and more particularly to the manually propelled or garden cultivators, and the like, and for the purpose of illustration is shown applied to a conventionally constructed implement of this class, including the main frame formed of spaced side rails 10, bearing wheel 11, on an axle 12, and handles 13.

Attached to the side rails 10 are standards 14 and 15 having bearings 30—31' at the upper ends, and mounted for rotation in the bearing 31' is a sleeve 16 carrying a chain wheel 17 in alinement with a like chain wheel 18 on the axle 12.

An endless chain 19 operates over the chain wheels 17 and 18, and thus transmits the motion of the axle and bearing wheel to the sleeve.

A relatively shallow cylindrical seed containing drum forms a part of the improved device and is formed of a circular shell formed with an inner wall 21 and annular rim 22, the drum being open at the side opposite to the wall 21 and closed by a detachable circular cover 23, the latter having a holding flange 24 fitting within the adjacent portion of the rim 22.

Formed on the sleeve 16 is a flange 25 and attached at 26 to the wall 21 of the drum, so that the drum and its closure 23 rotates with the sleeve.

The closure 23 is formed with a relatively large central opening, and fitting within the opening and which serves as a bearing therefor, is a disk like member 27. The member 27 is formed with a stub shaft or stud 28 at one side to engage in the sleeve 16, and with another stud 29 to engage the bearing 30 of the standard 14, the stud 29 being square or other form than round where it engages the bearing 30 so that the member 27 will be held from turning.

The member 27 is formed with a curved guideway 31 therethrough with its outer down turned end externally of the drum, and its upstanding inner end within the drum, and engaging the inner upturned end is a hopper shaped receiver 32.

A seed conductor tube 33 leads from the guideway 31 to convey the seeds to the ground, as illustrated in Figure 1, and is supported upon the adjacent frame member 10 by a clip 34. Fitting within the rim portion 22 of the drum is an annular member or band 35, and attached at spaced intervals to the inner face of the band are a plurality of buckets 36 open at one side.

A seed supply inlet 37 is formed through the member 27, and provided with a hinged closure 38.

The frame 10 of the device will be provided with the usual furrow openers and coverers, but they are not illustrated as they form no part of the improved apparatus.

The drum being supplied with a mass of seeds through the intake 37, the seeds will settle in a mass at the bottom of the drum, and when the apparatus is moved over the ground, the motion of the wheel 11 will be imparted to the drum, as before stated, and as the buckets pass through the mass of seeds, each bucket will pick up its quota of seeds and carry them upward and dump them consecutively into the hopper 32 from which they will pass through the conductor members 31 and 33 to the ground in a uniform stream.

By detaching the caps of the bearings 30 and 31' the drum and its attachments may be removed bodily, the closure 23 detached, and the band 35 removed and replaced by one having buckets 36 of different sizes or differently spaced, to adapt the device to planting seeds of different sizes or in hills variously spaced.

If it is desired to plant the seeds in hills or at spaced intervals, a band having limited number of the buckets will be employed.

A plurality of the bands 35 with buckets of different sizes, as illustrated in Figure 4, will be provided with each machine, to enable seeds of different sizes to be planted.

The improved apparatus is simple in construction, can be inexpensively manufactured, and adapted without material structural change to planting seeds of various sizes and in continuous drills or in spaced relation to form hills as may be required.

All of the parts may be of metal, or partly of metal and partly of wood as may be preferred.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:

1. In an apparatus of the class described a seed drum mounted for rotation and including an outer shell, a band detachably engaged within said shell, a plurality of bucket elements extending inwardly of the band and rotative therewith, a stationary receiver within the drum and into which the contents of the buckets are consecutively deposited as the drum and its inner band are rotated, and a seed conductor leading from the receiver.

2. An apparatus of the class described, comprising a supporting frame movable over the ground, standards rising from said frame, a sleeve mounted for rotation upon one of said standards, a seed drum including a shell open at one side and rotative with said sleeve, a closure for the open side of said shell, a band within said shell and carrying a plurality of buckets, and a receiver within said shell and its band and supported by said sleeve and the other standard and in position to receive the seeds elevated by said buckets, said receiver having a discharge conductor leading laterally therefrom, and means for rotating said seed drums and its associated band and buckets.

3. In an apparatus of the class described, a seed drum mounted for rotation and including a shell open at one side, a closure for the open side of the shell, a band within the shell rotatable therewith and insertible and removable through the open side of the same, a plurality of bucket elements carried by said band, a receiver within the shell and its band in position to receive the seeds elevated by the buckets, and a discharge conductor leading from said receiver.

4. In an apparatus of the class described, a seed drum mounted for rotation and open at one side, a detachable closure for said open side of the drum, a plurality of bucket elements extending inwardly of the drum and rotative therewith and removable and insertible through the open side of the drum, a stationary receiver within the drum and into which the contents of the buckets are consecutively deposited as the drum is rotated, and a seed conductor leading from the receiver.

5. In a seeder, a rotative drum open at one side, a detachable closure for the open side of the drum, a band detachably engaging the interior of the drum and insertible and removable through the open side of the same, a plurality of buckets extending from the band, a stationary receptacle within the drum in position to receive the seed when consecutively discharged from the buckets, and a conductor leading from the receptacle.

6. In a seeder, a cylindrical drum mounted for rotation and open at one side, a removable closure for the open side of the drum and rotative therewith, a stationary support around which said closure rotates, a receiver carried by said support within the drum, a conductor leading from said receiver, and a plurality of buckets rotative with the drum and discharging consecutively into said receiver.

In testimony whereof, we affix our signatures hereto.

JOSEPH C. DUROUAUX.
BENJAMIN ZENER.
DAVID G. ZENER.